UNITED STATES PATENT OFFICE 2,581,350

2-AMINOPYRIDINE SALT OF ESTRONE SULFATE

Desmond Beall, Westmount, Quebec, and Gordon A. Grant, Montreal, Quebec, Canada, assignors to Ayerst, McKenna & Harrison, Limited, St. Laurent, Quebec, Canada, a corporation of Canada No Drawing. Application October 31, 1950, Serial No. 193,288

1 Claim. (Cl. 260—239.5)

The present invention relates to a new salt of estrone 3-monosulphate.

The applicants have synthesized the 2-aminopyridine salt of estrone 3-monosulphate and have found that this salt has valuable properties in that it possesses oral estrogenic activity and is highly stable on storage. When assayed on adult ovariectomized rats the new salt has been found to be at least twice as active as an equivalent amount of estrone.

The applicants prepare this salt by bringing together a solution of sodium estrone 3-monosulphate with 2-aminopyridine. The reaction mixture is preferably adjusted to a substantially neutral pH, for example, from about 6 to about 8, to cause precipitation of the 2-aminopyridine salt of estrone 3-monosulphate. If desired, a salt of 2-aminopyridine may be used as starting material, for example, the acetate, the sulphate or the hydrochloride. In this case the desired 2-aminopyridine salt of estrone 3-monosulphate crystallizes out without any need of adjusting the pH.

The applicants have found that the 2-aminopyridine salt of estrone 3-monosulphate is slightly soluble in water, sparingly soluble in acetone, methanol or ethanol and insoluble in ether, benzene, or hexane. It is non-deliquescent and stable on standing under ordinary atmospheric conditions for a considerable length of time.

EXAMPLES

The following examples are to illustrate the preparation of the new salt of estrone 3-monosulphate and should not be taken in a limitative sense.

Example 1

To 3.1 g. of sodium estrone 3-monosulphate in 100 ml. of water at room temperature were added in a flask 3.2 g. of 2-aminopyridine sulphate in a minimum amount of water. A heavy crystalline precipitate was formed. This precipitate was then filtered off. The filtered precipitate was dissolved in a minimum amount of hot alcohol (25 ml.) and allowed to cool at room temperature. 1.84 g. of crystalline 2-aminopyridine salt of estrone 3-monosulphate was obtained.

Example 2

One g. of sodium estrone 3-monosulphate was dissolved in 50 ml. of water and a solution of 1 g. of 2-aminopyridine in 10 ml. of water was added. The pH was adjusted to 7.0 with 2 N hydrochloric acid and the resulting precipitate of 2-aminopyridine salt of estrone 3-monosulphate was filtered off and recrystallized from methanol.

We claim:

As a new compound, the 2-aminopyridine salt of estrone 3-monosulphate.

DESMOND BEALL.
GORDON A. GRANT.

No references cited.